Nov. 7, 1961

F. RADOCY 3,007,807

MAGNETIC RECORDING

Filed March 25, 1958

INVENTOR
FRANK RADOCY
BY
Pennie, Edmonds, Morton, Barrows & Taylor
ATTORNEYS 3,007,807

MAGNETIC RECORDING

Frank Radocy, Darien, Conn., assignor to Audio Devices, Inc.

Filed Mar. 25, 1958, Ser. No. 723,636
18 Claims. (Cl. 117—66)

Figure 1:
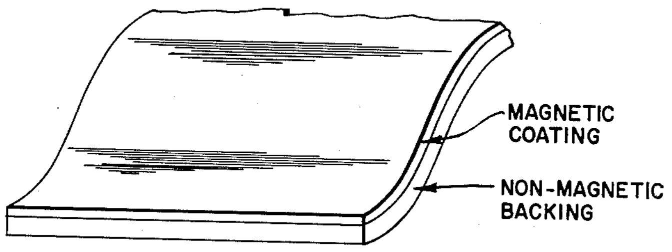

This invention relates to magnetic recording and has for its object improvements in the method of producing magnetic recording media and in the improved media as an article of manufacture. The invention relates more particularly to a method of reducing print-through in such media and with the media itself.

"Echoes," as the phenomenon of print-through is sometimes called, are magnetic images or prints transferred from one layer of magnetic tape to another by magnetic induction, which occurs when signals are recorded on a tape and the tape is wound on a reel. These magnetic images are most noticeable at the beginning or end of a recorded symphony, musical phrase, speech, or the like, when an echoed crescendo may be heard prior to the start of the recording, or after the recorded passage is ended, or both. This phenomenon is also called layer-to-layer signal transfer, etc.

Present magnetic recording tape is particularly susceptible to the formation of these undesired print-through effects, due to the increase in signal sensitivity, brought about by competitive efforts during recent years. This increase in sensitivity is due in part to iron oxide coating orientation techniques, changes in binder formulation and variations in the thickness of the coating. These methods for increasing signal sensitivity tend to increase the tape's susceptibility to print-through.

Numerous investigators have attempted to reduce the undesirable print-through properties. For instance, a coprecipitated ferrous oxalate and stannous oxalate has been suggested, this complex iron compound being treated so as to convert it to a magnetizable iron oxide. This oxide allegedly produces a recording tape having lower print-through properties.

Another attempt is to interleaf a non-magnetic ribbon between adjacent layers of standard recording tape. This interleafing, it is claimed, tends to reduce print-through, by the added separation of the wound up turns of tape. This method is undesirable as it requires special winding techniques and also greatly increases the bulk of the wound reels.

Another method commonly used to reduce print-through is to coat the magnetic layer on a heavy gauge non-magnetic tape base, thus increasing the spacing between adjacent layers and thereby weakening the effects of magnetic induction by physical spacing. This method is undesirable as it also reduces the total tape footage that may be wound on a given reel. An additional undesirable feature of this method is the loss of physical flexibility which prevents the tape from conforming properly to the magnetic recording heads.

Still another method to reduce print-through is the reduction of the residual magnetism (B*r*) of the magnetic coating, i.e., the reduction of the amount of magnetic material per unit of area in the magnetic coating. This is accomplished by adding greater proportions of non-magnetic binder to the magnetic material. This method is undesirable as it lowers the sensitivity of the tape and, therefore, is not compatible with present day tapes.

I have found that by combining certain ingredients with the binders and by employing special milling techniques, the susceptibility to print-through can be substantially reduced while still retaining the high sensitivity and other desirable features of present day magnetic recording tapes. This practice overcomes the complexity of the first prior proposal, the unnecessary bulk of the second and third proposals, and the low sensitivity of the fourth proposal. Furthermore, the new practice is simple and economical.

Reference may be made to the accompanying drawing to get a pictorial representation of tape made in accordance with the invention.

Figure 2:
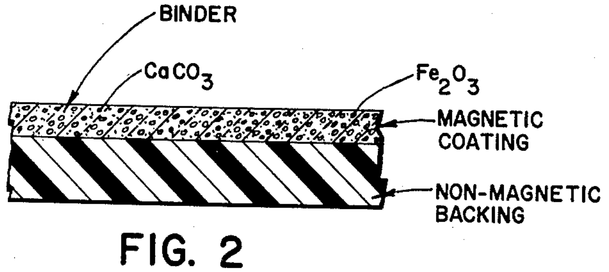

FIG. 1 is a diagrammatic perspective view of an enlarged piece of magnetic recording tape, which may be considered as coming from a roll of same; and FIG. 2 is a cross-sectional view of part of the same piece of tape, in an even more enlarged form, illustrative of a practice of the invention.

Referring to the first figure, it shows a non-magnetic backing or base, such as plastic, and a magnetic coating on one side thereof. The second figure bears legends showing the non-magnetic backing as well as the magnetic coating. The latter also bears legends pointing to the presence in the coating of magnetic iron oxide, $Fe_2O_3$, inert or non-magnetic calcium carbonate, $CaCO_3$, and binder.

The property of print-through, as indicated, is the transfer of a recorded signal from one layer of magnetic recording tape to one or several adjacent layers by magnetic induction. It is expressed as the difference in decibels (db) between the original signal and its resultant print. For the purpose of establishing numerical values with which to evaluate the invention, the following specific test procedures were followed, in accordance with Interim Federal Specification WT–0061:

The tape is externally erased. With the recorder operating with normal erase and bias currents and with no input signal, ten layers of tape are recorded and wound on a 4½" diameter reel (N.A.B. Hub). The record level is increased to maximum recording level, at 1 kc. and 7½" per second tape speed, and one additional layer is recorded. The record level is returned to zero and ten additional layers are recorded and wound on the reel. The recorded tape is conditioned at a temperature of 150° F. for a period of four hours. The tape is then played back and the output of the playback amplifiers is connected to a 1000 c.p.s. band-pass filter and the output of the filter is measured across a 600 ohm load. The level of the recorded signal and the level of the highest signal resulting from signal transfer are measured.

The relatively low print-through tape of the invention can be obtained by combining (1) the addition of very small particles of an inert, non-magnetizable material to the coating compound preferably followed with (2) a special technique of dispersion. In particular the invention contemplates the use of fine particle size inert materials, such as calcium carbonate, barium sulphate, talc, diatomaceous earth, kaolin and the like. I do not wish to limit myself to these alone, but prefer the use of any fine filler or extender of comparable particle size. All of these substances, through chemically widely different, have several properties in common which make them valuable for the purpose. They are (1) Chemically inert
(2) Non-magnetizable
(3) Colorless, i.e., non-tinting
(4) Available in the form of very fine particles (i.e., below 1 micron diameter)

The addition of these inert substances to the coating mixture during the dispersing phase imparts an extremely thixotropic nature to the mix. The thixotropic nature of the magnetic mix resists the battering forces of the grinding media and provides greater shearing forces for dispersing. Careful studies comparing tapes treated with the addition of inert substances in the dispersing phase to tapes without such treatment indicates a 3 to 4 db improvement in the print-through of the treated tape.

It was found that the print-through of a tape could be further improved upon by carefully selecting a suitable ball mill grinding media and adjusting the time of grind for minimum print-through effect. Controlled studies in which various grinding media, such as ceramic balls, pebbles or the like, instead of the conventional steel balls, were tested along with variations in milling time, indicated that 3 to 4 db improvement in print-through was possible by these means alone; although some improvement is possible with the steel balls.

It was further found that by combining the two processes, i.e., adding inert substances to the magnetic material during the milling phase, and by milling certain periods of time with specially selected grinding media, we can with great regularity produce a magnetic recording tape with 6 to 8 db improvement in print-through.

More specifically, I have found that by adding extremely finely divided calcium carbonate in the amount of 10% by weight of the magnetic iron oxide in the mix, and by milling seven days in a ball mill, using ceramic balls as a grinding media, I can produce a magnetic recording tape that has a minimum remanence (B*r*) of 600 gauss and when coated on a .0015" non-magnetic tape base, will have a print-through not less than 53 db.

Attention may be directed to the following two experiments:

*Experiment I*

A sample of normal production tape, having an iron oxide coating approximately 0.0006 inch thick was prepared, and tested in conformance with the procedures previously described. The standard reference output signal level was adjusted so that the level of the echo was 5 db above the minimum hearing threshold of the test room.

*Experiment II*

In this experiment the improved low echo tape was similarly prepared (but with the stated 10% calcium carbonate) and the output level of the standard reference signal was adjusted to the same level as Experiment I. However, in Experiment II the echo effect was completely inaudible, as its signal level was now found to be 6 db lower than that of the material not made in accordance with the invention, i.e., 1 db below the minimum threshold of hearing. Thus, the echo or print-through audible effect was completely non-existent to the normal ear.

It is thus apparent that the practice of the invention results in a superior magnetic recording tape having inaudbile or very low echo or print-through effects.

It will be clear that one or more suitable inert, non-magnetizable, pigments may be employed in the binder mixture. At the present time calcium carbonate alone is used to simplify the operation.

Although, as indicated, reduced print-through may be obtained by milling the binder mixture with steel balls, the results are not as pronounced as with pebbles or ceramic balls. Steel balls have a high density and tend to batter or hammer the magnetizable and the non-magnetizable solids in the mixture. Pebbles and ceramic balls, on the other hand, have a relatively low specific gravity. They tend to exert a stirring, rather than a hammering or battering, action on the solids, thus more gently breaking up clusters of iron oxide particles. The resulting light grinding is more effective in reducing print-through.

While I am not certain precisely what happens when the finely divided inert, non-magnetizable, material is incorporated in the binder, the following explanation appears plausible at this time:

In its simplest form print-through may be considered as being caused by a transfer of magnetism from an energized iron oxide magnet in one layer of the magnetic recording tape to an iron oxide magnet in an adjacent layer of the tape wound on a reel. That is, the transfer may be from the first layer to its adjacent outer layer or inner layer, or both. Actually, the tape is coated with a great multiplicity of iron oxide magnets, so that print-through involves many magnets on each layer.

The magnetic properties of an iron oxide coating depend upon a number of factors, including the effective particles sizes of the oxide; and that includes clusters or agglomerates of the iron oxide particles. Dispersion of the iron oxide is provided in a suitable organic vehicle or carrier, the vehicle usually containing a solvent such as toluol, isopropyl acetate, etc. The dispersion has a viscosity that lends itself to the laying down of a coating of a given thickness on the tape base which remains intact during the drying operation. The solvent having volatilized during the drying operation, a solid but pliable residue of the iron oxide remains on the tape base. There is a marked tendency for the oxide particles to form clusters or agglomerates in the dispersion during the milling operation. For that reason the dispersion is usually subjected to prolonged milling. This is to break up the clusters and to disperse their individual particles as widely as possible. In spite of this precaution, single, individual, particles tend not to remain dispersed. Each particle of oxide in each cluster is brought into and remains in intimate contact with one or more other particles. Hence each cluster tends to function as an individual but substantially larger particle of oxide; the greater the number of the single particles in a cluster, the larger generally speaking is the cluster. The cluster acts as a unit.

It is believed that a single unattached particle is more difficult to magnetize than a group of particles attached in a cluster. In other words, a cluster is believed to be more sensitive to stray magnetic fields than a single, unattached, particle outside of the cluster. It is these clusters on adjacent layers of the tape which are mostly affected by the induced magnetism from a recorded signal on the oxide coating of the tape and which in turn result in the objectionable echoes with which the present invention is concerned.

It is believed that the magnetic images found in echoes, or print-through effects, are substantially lessened when the clusters are broken up into their individual oxide particles, and when they remain broken up. An object of the present invention is to prevent or greatly to inhibit clusters from forming. It is further believed that the extremely fine inert, non-magnetizable, materials herein contemplated work toward that end when they are incorporated in the oxide dispersion and the mixture is subjected to a thorough milling or grinding operation. The added material is inert to the dispersion, including organic vehicle, solvent, oxide, etc. and cannot be magnetized. The inert non-magnetizable, particles tend to envelope the oxide particles and to that extent act as mechanical separators, or barriers, keeping the oxide particles out of contact with each other. The inert particles thus keep the oxide particles from coalescing into clusters, or at least substantially lessen the number of clusters formed, as well as keeping down the size of clusters nevertheless formed. The less the number of clusters and the less the size of the clusters, the less sensitive is the iron oxide of the tape coating to stray magnetic fields, and hence the less is the amount of print-through. All in all, the inert additive may be regarded as a highly effective dispersing agent for the oxide particles.

It will be clear to those skilled in this art that the above examples are merely illustrative, and that the practice of the invention lends itself to a number of useful modifications.

I claim:

1. In the method of producing magnetic recording tape with reduced print-through characteristics, the improvement which comprises incorporating very finely divided inert, non-magnetizable, pigment particles in a binder containing an organic solvent and magnetizable iron oxide particles, thoroughly milling the resulting mixture to break up clusters of the magnetizable iron oxide particles and to disperse the non-magnetizable pigment particles among the magnetizable iron oxide particles, promptly coating a non-magnetic base with the resulting milled mixture, and evaporating the organic solvent from the coating, the non-magnetizable pigment particles being present in the coating in amount substantially to reduce said print-through characteristics.

2. Method according to claim 1, in which the mixture is milled with pebbles.

3. Method according to claim 1, in which the mixture is milled with ceramic balls.

4. Method according to claim 1, in which the mixture is milled with steel balls.

5. Method according to claim 1, in which the inert, non-magnetizable, pigment includes calcium carbonate.

6. Method according to claim 1, in which the inert, non-magnetizable, pigment includes barium sulphate.

7. Method according to claim 1, in which the inert, non-magnetizable, pigment includes talc.

8. Method according to claim 1, in which the inert, non-magnetizable, pigment includes diatomaceous earth.

9. Method according to claim 1, in which the inert, non-magnetizable, pigment includes kaolin.

10. Method according to claim 1, in which the inert pigment includes calcium carbonate, and the mixture is milled with pebbles.

11. Method according to claim 1, in which the inert pigment includes calcium carbonate, and the mixture is milled with ceramic balls.

12. Method according to claim 1, in which the inert pigment includes calcium carbonate, and the mixture is milled with steel balls.

13. In magnetic sound recording tape with reduced print-through characteristics, the improvement comprising a tape formed of a non-magnetic base and a coating thereon of a binder containing magnetizable iron oxide particles, the coating containing an intimate admixture of the binder and magnetizable iron oxide particles with very finely divided inert, non-magnetizable, pigment particles, and the non-magnetizable pigment particles being present in the coating in amount substantially to reduce said print-through characteristics.

14. Magnetic sound recording tape according to claim 13, in which the inert, non-magnetizable, pigment includes calcium carbonate.

15. Magnetic sound recording tape according to claim 13, in which the inert, non-magnetizable, pigment includes barium sulphate.

16. Magnetic sound recording tape according to claim 13, in which the inert, non-magnetizable, pigment includes talc.

17. Magnetic sound recording tape according to claim 13, in which the inert, non-magnetizable, pigment includes diatomaceous earth.

18. Magnetic sound recording tape according to claim 13, in which the inert, non-magnetizable, pigment includes kaolin.

References Cited in the file of this patent

UNITED STATES PATENTS

| | | |
|---|---|---|
| 1,640,885 | Curtis | Aug. 30, 1927 |
| 1,832,852 | Brandus | Sept. 15, 1931 |
| 2,105,092 | Neighbors | Jan. 11, 1938 |
| 2,230,228 | Bandur | Feb. 4, 1941 |
| 2,267,999 | Switzer | Dec. 30, 1941 |
| 2,418,479 | Pratt et al. | Apr. 8, 1947 |
| 2,525,601 | Howell | Oct. 10, 1950 |
| 2,734,033 | Menard | Feb. 7, 1956 |
| 2,801,804 | Frankert | Aug. 6, 1957 |

FOREIGN PATENTS

| | | |
|---|---|---|
| 141,491 | Australia | Feb. 12, 1948 |

UNITED STATES PATENT OFFICE
CERTIFICATE OF CORRECTION

Patent No. 3,007,807 November 7, 1961

Frank Radocy

It is hereby certified that error appears in the above numbered patent requiring correction and that the said Letters Patent should read as corrected below.

Column 2, line 55, for "through" read -- though --; column 6, line 26, for "1,832,852" read -- 1,823,852 --.

Signed and sealed this 10th day of April 1962.

(SEAL)
Attest:

ERNEST W. SWIDER
Attesting Officer

DAVID L. LADD
Commissioner of Patents